United States Patent [19]
Burke et al.

[11] Patent Number: 5,383,316
[45] Date of Patent: Jan. 24, 1995

[54] LOOP SEAL EXPANSION JOINT

[75] Inventors: James Burke, Mesa County, Colo.; Ed Linck, Kemah, Tex.

[73] Assignee: Pyropower Corporation, San Diego, Calif.

[21] Appl. No.: 773,217

[22] Filed: Oct. 9, 1991

Related U.S. Application Data

[63] Continuation-in-part of Ser. No. 697,111, May 8, 1991, which is a continuation-in-part of Ser. No. 598,250, Oct. 16, 1990, Pat. No. 5,311,715.

[51] Int. Cl.⁶ .......................................... E04H 12/28
[52] U.S. Cl. ...................................... 52/218; 52/402; 52/395
[58] Field of Search ............... 52/395, 396, 393, 218, 52/402, 302, 303

[56] References Cited

U.S. PATENT DOCUMENTS

| | | | |
|---|---|---|---|
| 3,421,267 | 1/1969 | Balzer et al. | 52/395 X |
| 3,435,574 | 4/1969 | Hallock | 52/395 X |
| 4,866,898 | 9/1989 | LaRoche et al. | 52/396 |
| 4,882,890 | 11/1989 | Rizza | 52/395 X |
| 4,967,527 | 11/1990 | Gohlke | 52/396 |
| 4,977,719 | 12/1990 | LaRoche et al. | 52/396 |

*Primary Examiner*—Lanna Mai
*Attorney, Agent, or Firm*—Baker, Maxham, Jester & Meador

[57] ABSTRACT

An expansion joint and flexible seal for refractory lined flues includes a baffle system in combination with a filter element and an air purge system for preventing egress of flue particulates. The baffle system is slideably positionable to accommodate relative lateral displacement of the flues.

9 Claims, 7 Drawing Sheets

LOOP SEAL EXPANSION JOINT

BACKGROUND OF THE INVENTION

The present application is a continuation-in-part of application Ser. No. 07/697,111, filed May 8, 1991, which is a continuation-in-part of application Ser. No. 07/598,250, filed Oct. 16, 1990, now U.S. Pat. No. 5,311,715.

The field of the present invention is expansion joints for ducting and flue systems, and more particularly, nonmetallic flexible expansion joints to provide stress relief in refactory lined flue systems used in high temperature applications such as power generation and related activities.

Figure 1:
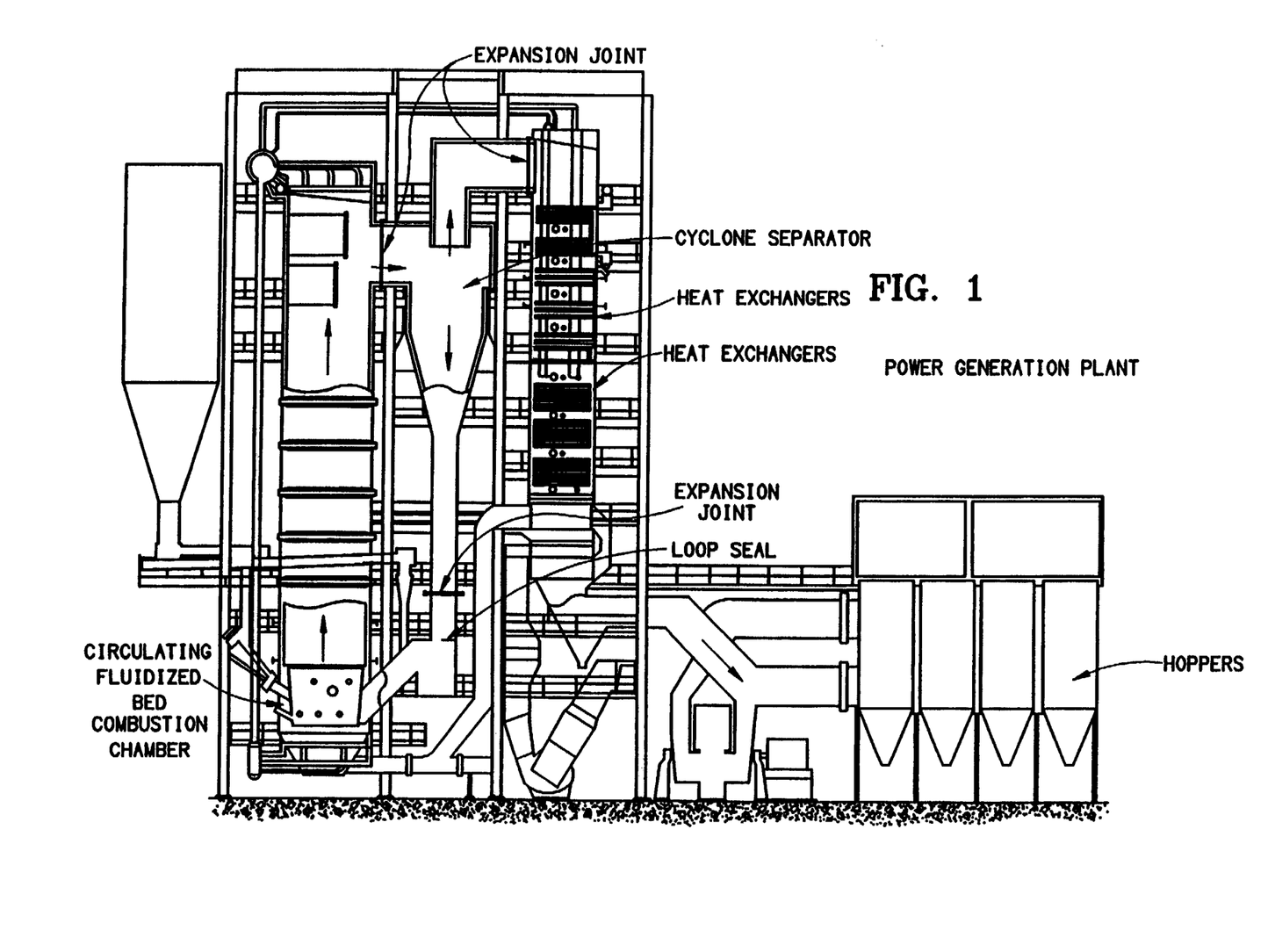
FIG. 1 is a diagrammatic view of a fluidized circulating bed power generation plant that includes expansion joints in the ducting system thereof.

In power generating or cogeneration plants, including facilities for obtaining useable electrical power or processing steam/hot water from the burning of solid, liquid or gaseous fuel products, hot flue gases generated by the combustion process are typically directed through a series of processing areas to remove particulates and environmentally hazardous components before finally being exhausted from the facility. FIG. 1 illustrates a power generation plant of unique design that includes a furnace having a circulating fluidized bed (CFB) wherein various fuel materials are combusted. The hot flue gases containing combustion by-products are transferred from the furnace through a flue duct/expansion joint to a cyclone separator. The cyclone separator diverts heavier combustion particulate matter back to the CFB, through a loop seal assembly, which lifts the heavy particulates, mixes them with freshly fed fuel, and introduces the mixture to the combustion chamber. The fine particulate matter and hot flue gases are directed through a heat exchanger. The fine particulate matter is then diverted to a particulate filter for disposal. Gases emitted from the facility will have most of the combustion by-product emissions, including $NO_x$, $SO_2$, CO, particulates, etc., removed therefrom, resulting in an environmentally safe means of power generation.

Nonmetallic expansion joints are flexible connectors designed to provide stress relief in flue duct systems by absorbing movement caused by thermal changes. They also act as vibration isolators, and in some instances, make up for minor misalignment of adjoining flue ducts and/or equipment. They may be fabricated from a wide variety of nonmetallic materials, including synthetic elastomers, fabrics, insulation materials and other suitable materials depending upon the designs thereof. Since their introduction in the early 1960's, the use of nonmetallic expansion joints has continuously grown. The advent of more rigid emission standards has caused the use of more complex flue work systems. Nonmetallic expansion joints have been used in place of the traditional all metal expansion joints to solve problems caused by the thermal and mechanical stresses generated in these complex systems. Although the major user of the nonmetallic joint continues to be the power generation industry, the use of this product has expanded into many other industries wherein gases are conveyed including pulp and paper plants, refineries, steel mills, foundries, smelters, cement plants, kilns, refuse incineration, marine applications, vapor-heat-dust recovery, food processing, and HVAC (Heating, Ventilating and Air Conditioning).

Figures 2, 3, 4:
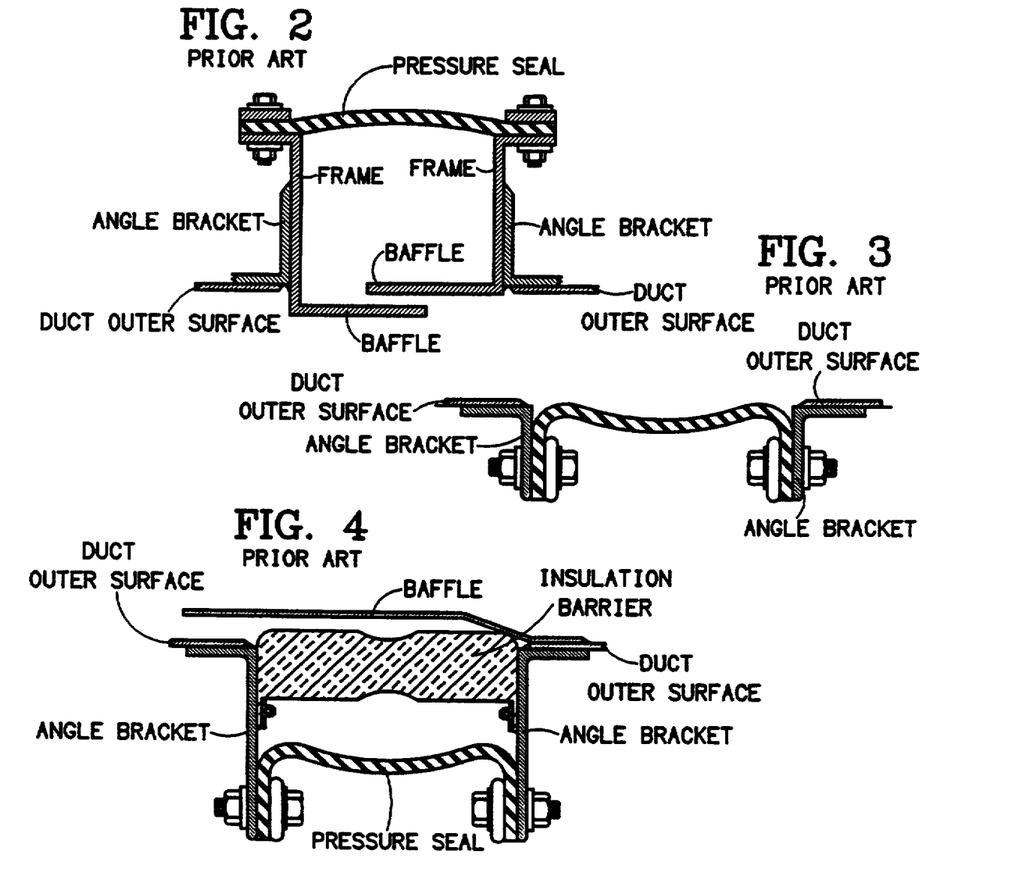
FIG. 2 is a detailed cross-sectional view of a prior art expansion joint having a baffle system to prevent premature joint failure.
FIG. 3 is a detailed cross-sectional view of another prior art expansion joint having a flush mounted flexible pressure seal also designed to eliminate premature joint failure.
FIG. 4 is a detailed cross-sectional view of still another prior art expansion joint having an insulation barrier and baffle system also designed to minimize premature joint failure.

A typical prior art nonmetallic expansion joint is shown in FIG. 2. The joint includes a pair of angle brackets mounted to the respective ends of a pair of adjoining ducts or flues. A pair of frame members are in turn attached to the angle brackets. The frame members have mounted thereto a flexible pressure seal that extends around the periphery of the expansion joint. The pressure seal may be of the elastomeric type for operation below 400 degrees F or may be of the composite type for operation at temperatures continuously above 400 degrees F. It will be appreciated that the flexible pressure seal allows relative axial, transverse, angular and rotational movement between the respective ducts while preventing the escape of pressurized flue gasses and particulates carried therein. Other nonmetallic expansion joint constructions may be seen in the "Technical Handbook" published by the Ducting Systems Nonmetallic Expansion Joint Division of the Fluid Sealing Association, 2017 Walnut Street, Philadelphia, Pa. 19103 (2nd Edition), the contents of which are fully incorporated herein by this reference.

It is known that nonmetallic expansion joints are prone to failure from the build-up of abrasive particulates carried by the flue gas stream, which can accumulate in the expansion joint in such quantities that they eventually rupture the pressure seal. Moreover, fly ash and other particulates can cause damage to the expansion joint by solidifying to a cementatious state. Also, certain non-cementatious particulates (fly ash) can create a severe, corrosive (acidic) environment when subjected to cooling (below the $H_2SO_4$ dew point) during a maintenance outage.

To prevent premature expansion joint failure from the build up of particulate matter therein, baffles have been proposed to help direct particulate matter beyond the expansion joint, as shown in FIG. 2. Other proposals include mounting the flexible pressure seal substantially flush with the interior surface of the duct or flue, as shown in FIG. 3, or mounting an insulation barrier behind a baffle arrangement as shown in FIG. 4. Although these proposals may exhibit varying degrees of effectiveness in minimizing expansion joint failure, the arrangement of FIG. 3 may result in thermal transfer on the inner face of the expansion joint and abrasion from particulates in the gas stream. A greater setback would be desirable. The arrangement of FIG. 4 may result in the insulation barrier rubbing on the baffle under negative pressures. Moreover, the insulation barrier must be fixedly attached to both sides of the joint, which may complicate joint construction and also impart adverse loads on the barrier.

Accordingly, there is an evident need for an expansion joint flexible seal which not only prevents particulate build up, but which is durable, easy to install and will perform satisfactorily despite joint movement. It would be further desirable to provide an expansion joint flexible seal that also performs a sealing function to provide an additional gas sealing barrier.

The present invention accomplishes the foregoing objects and advantages. It is therefore an object of the present invention to provide an improved expansion joint and flexible seal therefor.

It is a further object of the present invention to provide an expansion joint having a flexible seal that is not adversely affected by relative joint movement.

It is a further object of the present invention to provide an expansion joint having a modular construction for easier installation.

It is a further object of the present invention to provide an expansion joint and flexible seal therefor providing an additional gas sealing barrier.

It is a further object of the present invention to provide a loop seal expansion joint for use in joints subject to lateral misalignment.

SUMMARY OF THE INVENTION

The present invention employs concepts for an expansion joint and flexible seal therefor that accomplish the foregoing objects and advantages. In accordance therewith, an expansion joint may include flexible seal means having flexible insulating body means and filter means positioned adjacent thereto. Additional filter element means may be provided, as well as flexible seal mounting means for easy installation and joint accessibility. In a further aspect applicable to joints that must accommodate longitudinal offset movements, a baffle system may be provided in combination with filter element means and an air purge system for preventing egress of flue particulates.

BRIEF DESCRIPTION OF THE DRAWINGS

The objects, advantages and features of this invention will be more clearly perceived from the following detailed description when read in accordance with the accompanying drawing in which.

DETAILED DESCRIPTION OF PREFERRED EMBODIMENTS

Figure 5:
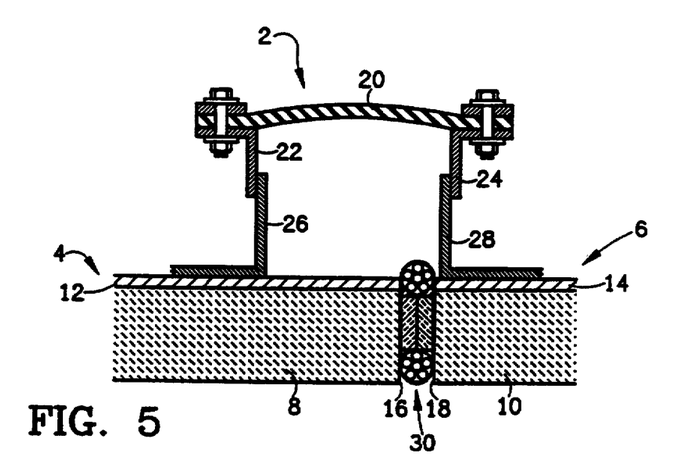
FIG. 5 is a detailed cross-sectional view of a nonmetallic expansion joint and flexible seal constructed in accordance with the present invention.

Referring now to FIG. 5, the invention may be embodied in structural form in a nonmetallic expansion joint 2 provided between a pair of refractory lined flues 4 and 6. The flues 4 and 6 include respective refractory portions 8 and 10 and metallic outer casings 12 and 14, respectively. The flue sections 4 and 6 terminate at respective terminal faces 16 and 18 which are positioned to form a gap extending around the periphery of the duct sections. There is also conventionally provided a pressure seal assembly including a flexible pressure seal 20 fastened in conventional fashion to a pair of angle frames 22 and 24 which are in turn mounted to a pair of angle brackets 26 and 28 that are permanently attached by welding or other means to the casings 12 and 14 of the flues 4 and 6. Disposed in the gap formed by the terminal flue faces 16 and 18 is a flexible seal assembly 30, the details of which will now be described.

Figure 6:
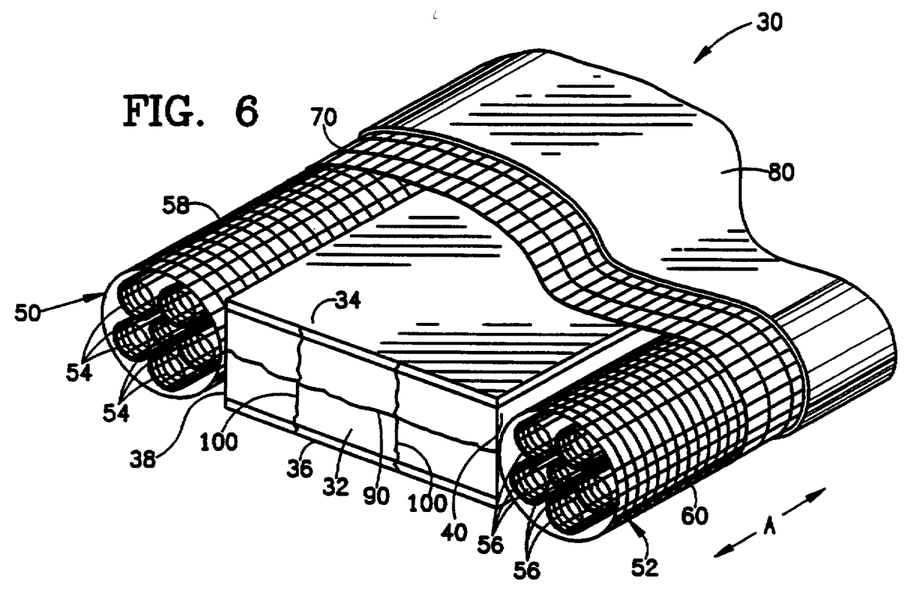
FIG. 6 is a detailed isometric view of a flexible seal constructed in accordance with the present invention having a portion broken away for clarity.

Turning now to FIG. 6, the flexible seal assembly 30 includes a flexible insulating body 32 made from a ceramic fiber blanket material of suitable density, such as blown or spun alumina silicate material, and a pair of insulating side panels 34 and 36 also made from a ceramic fiber board material of suitable density providing a pair of lateral or side faces adapted for positioning adjacent and parallel to the respective terminal flue faces 16 and 18. The flexible insulating body 32 further includes a pair of end faces 38 and 40 adapted to be positioned generally perpendicularly to the terminal flue faces 16 and 18. The insulating body further includes a longitudinal dimension extending in a direction shown by the arrow A, so as to generally extend along the perimeter of the flue elements 4 and 6.

The flexible seal 30 further includes a pair of filter elements 50 and 52 positioned adjacent to the respective end faces 38 and 40 and extending in the longitudinal direction of the insulating body. The filter elements are preferably formed from a wire mesh material arranged in a plurality of wrapping arrangements. Thus, a suitable wire mesh material such as 304 SS wire mesh may be rolled into a series of tubes 54 and 56. To form the filter element 50, a plurality of the tubes 54 may be arranged in a bundle, with one of the tubes 54 serving as a central core tube, and wrapped in a larger wire mesh wrapping 58 to complete the filter element 50. Similarly, the filter element 52 can be formed by a plurality of wire mesh tube elements 56 arranged around a central core tube to form a tube bundle, with the bundle being wrapped in a larger wire mesh wrapping 60 to form the filter element 52. Alternatively, the filter elements 50 and 52 could be formed from a pair of solid core flexible hoses. Other filter constructions could also be employed.

Means are provided for securing the filter elements 50 and 52 to the insulating body 32 in the form of a wire mesh wrapping 70 that extends around the filter elements and the insulating body. The wire mesh wrapping may also be 304SS wire mesh. The assembly 30 may be further secured in an exterior flexible casing or wrapping 80 formed from high temperature plastic, or other material. Other wrapping configurations would also no doubt be possible. For example, there may be provided a thin (e.g. one-sixteenth inch) ceramic fiber paper covering under the exterior wrapping 80.

The flexible seal assembly 30 may further be secured with a wire mesh cloth 90 extending between the filter elements 50 and 52, through the insulating core 32. There may be also provided a pair of transverse tie-wires 100 extending through the insulating core 32 and side panels 34 and 36. The transverse tie wires 100 may be anchored in the external wire mesh wrapping 70.

Figure 7:
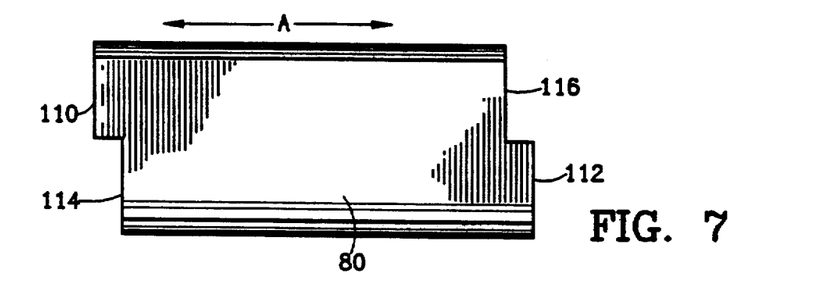
FIG. 7 is a plan view of the flexible seal of FIG. 6 having end portions adapted for interlocking with adjacent flexible seal elements.

Turning now to FIG. 7, the flexible seal assembly 30 includes end portions 110 and 112 having respective cut-outs 114 and 116 formed therein to provide for interlocking arrangement of successive seal assemblies disposed around the periphery of the flues 4 and 6.

Figure 8:
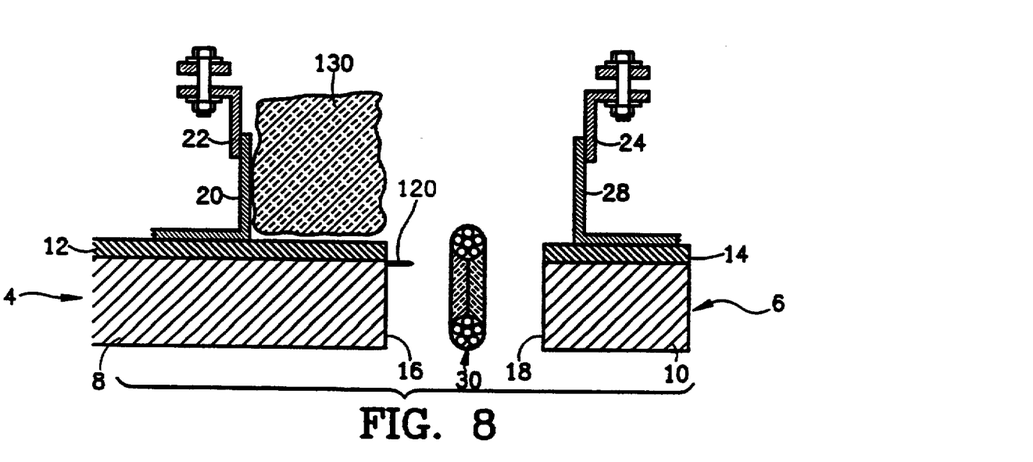
FIG. 8 is an exploded detailed cross-sectional view of a nonmetallic expansion joint and flexible seal constructed in accordance with the present invention.

As further shown in FIG. 8, the modular seal assemblies 30 may be easily joined in forming the expansion joint tube by initially mounting the seal assemblies on pin members 120 extending from the terminal face 16 of the flue 4 attached to the flue 4. Once the seal assemblies 30 are arranged around the periphery of the flue 4 on the pins 120, the adjoining flue section 6 may be applied into place against the seal assemblies 30 until the seal assemblies are moderately compressed. The external pressure seal may then be attached to the angle frame members 22 and 24 to complete the seal. Alternatively, additional insulative material 130 may be placed between the angle brackets 26 and 28 and the pressure seal 20 attached thereafter. The insulative material 130 will provide an additional insulative barrier between the hot duct flue gases and the external pressure seal.

Figure 9:
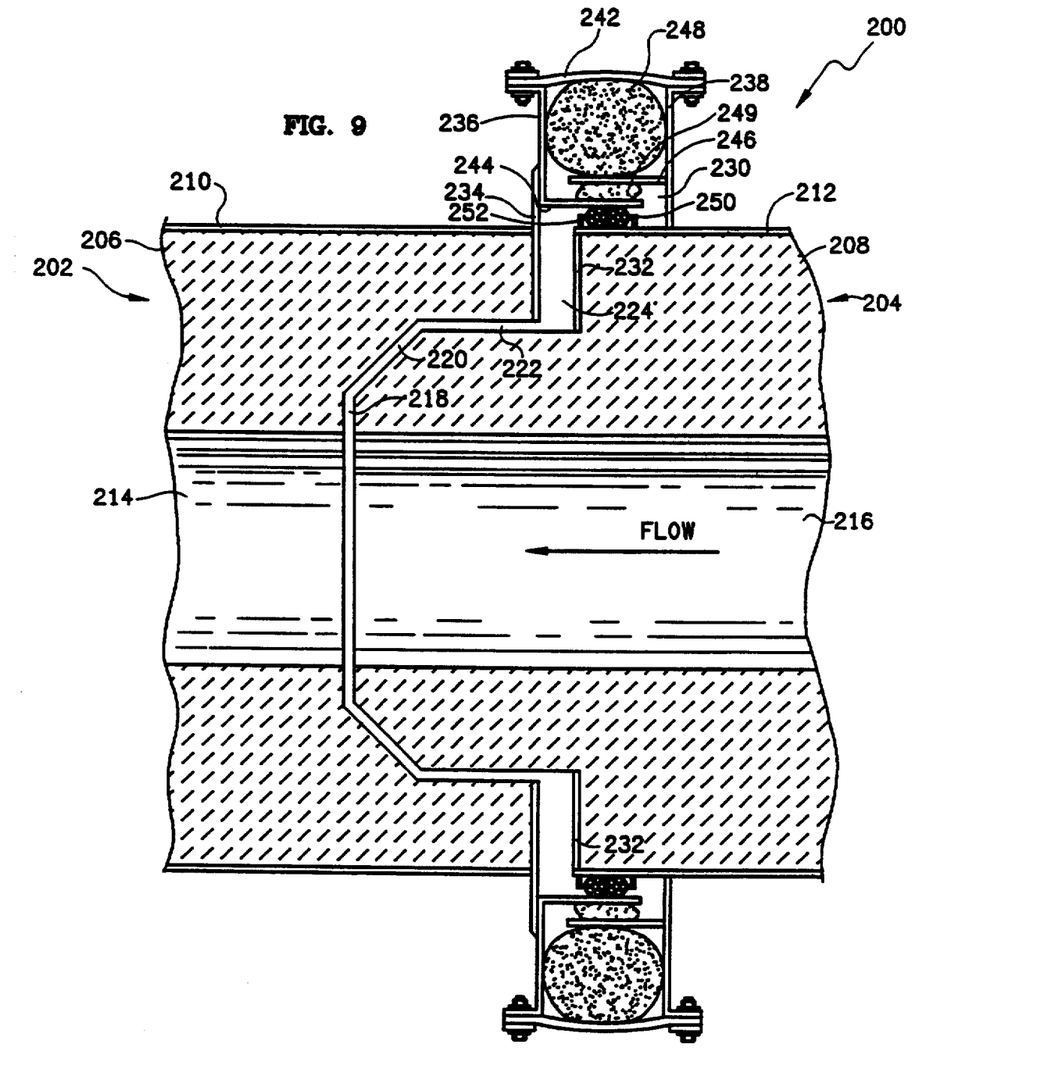
FIG. 9 is a cross-sectional view of an expansion joint constructed in accordance with another aspect of the invention.

Referring now to FIGS. 1 and 9, an expansion joint and sealing arrangement 200 may be further provided in a power generation plant between the cyclone separator and the loop seal assembly. In this location, substantial longitudinal movements are common and therefore an expansion seal accommodating such movement is required. As shown in FIG. 9, the expansion joint 200 provides a longitudinally flexible connection between refractory lined flues 202 and 204. Unless otherwise noted, it is understood that the components of the expansion joint are formed in a preferred construction from carbon steel. The flues 202 and 204 include respective refractory portions 206 and 208 and outer casings 210 and 212. Each flue duct also includes an interior flow chamber 214 and 216, respectively. In the environment of FIG. 1, the flue 204 would represent the lower extension of the cyclone separator and the flue 202 would represent the upward extension of the loop seal.

In order assist in preventing the egress of fluidized bed material, such as sand, fuel particulates, limestone and other particles, the refractory material 206 of the loop seal flue 202 has a concavity at the end thereof adapted to receive a refractory extension portion of the refractory material 208 of the cyclone separator flue 204. The respective concave and extended ends of the flues 202 and 204 are adjacently positioned so as to form passages 218, 220, 222 and 224. These passages extend continuously about the centerline of the chambers 214 and 216. The passages extend from the flow chambers 214 and 216 to a series of labyrinth passages 226 and 228, and finally, to an expandable sealing chamber 230. As will be appreciated from FIG. 9, the passage 218 is generally annular, the passage 220 is generally frusto-conical in nature, the passage 222 is generally ring-shaped, and the passage is generally annular.

Figures 10, 11, 12:
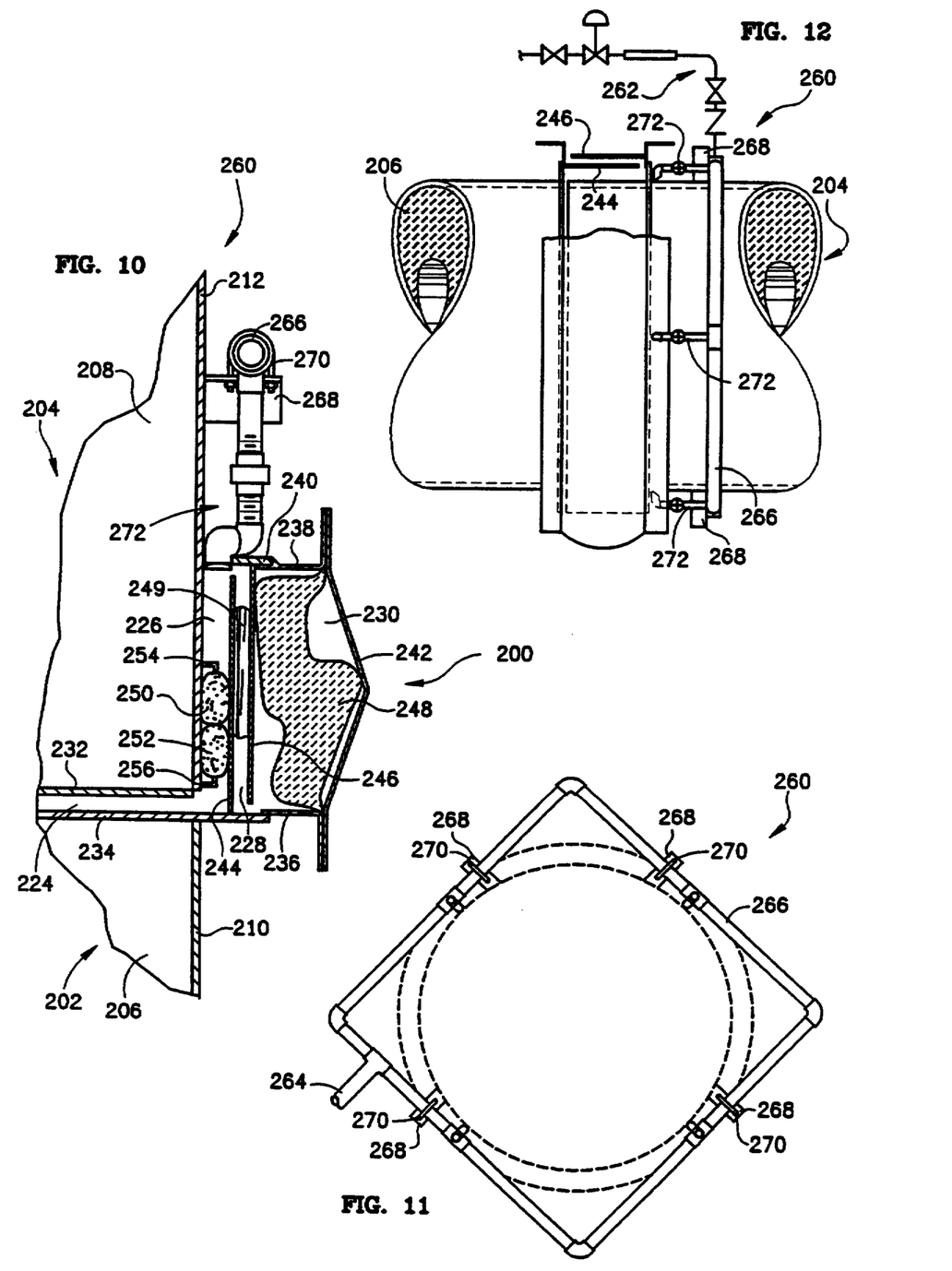
FIG. 10 is a detailed cross-sectional view of the expansion joint of FIG. 9.
FIG. 11 is a partially diagrammatic plan view of an air purge system for use with the expansion joint of FIG. 9.
FIG. 12 is a partially diagrammatic side view of the air purge system of FIG. 9.

Referring now to FIG. 10, the expansion joint 200 is shown in greater detail. The passage 224 is defined by an annular flange 232 mounted at the lower end of the flue 204 and an annular flange 234 mounted at the upper end of the flue 202. The flange 234 extends radially outwardly from the casing 210 of the flue 202 and provides support for an angle bracket 236 which is attached thereto in conventional fashion as by welding or the like. A second angle bracket 238 is mounted at the other end of the sealing chamber 230, to an annular flange 240 that is attached to the outer casing 212 of the flue 204 in conventional fashion, as by welding or the like. Mounted to the angle brackets 236 and 238 is a flexible pressure seal 242 which is preferably formed from a flexible material such as fiberglass fabric belting or the like.

Passageway 226 is defined on one side by the exterior surface of the casing 212 of the flue 204 and on the other side by a ring-shaped baffle plate 244 mounted to the flange 234 in conventional fashion as by welding or the like. The baffle plate 244 extends generally parallel to and around the periphery of the casing 212 and terminates adjacent the annular flange 240. The passage 228 is formed on one side by the baffle plate 244 and on the other side by a second ring-shaped baffle plate 246 mounted to the flange 240 in conventional fashion, as by welding or the like. The baffle plate 246 extends generally parallel to and around the periphery of the baffle plate 244, from the flange 240 to a location adjacent the flange 234. Thus, the passages 226 and 228 form labyrinth of concentric passages extending from the passage 224 to the sealing chamber 230.

Disposed within the chamber 230 is an insulation pillow 248 which is preferably formed from ceramic fiber material encased in a fiberglass cloth bag. Optionally, there may be further provided an insulation blanket 249 which is preferably formed from ceramic fiber material.

To assist in providing an effective seal between the interior passageways 218, 220, 222 and 224, and the sealing chamber 230, there are provided in the labyrinth passage 226 a pair of tubular filter elements 250 and 252 positioned adjacent each other and extending around the periphery of the casing 212 of the flue 204. The tubular filter elements 250 and 252 are of the same type as the filter elements 50 and 52 described above. The filter elements 250 and 252 are therefore preferably formed from a wire mesh nickel-chrome alloy material, such as Inconel. Depending on the required diameter, the filter elements 250 and 252 may be formed from a single wire mesh tube or may be formed from several wire mesh tubes arranged in a bundle and surrounded by a wire mesh sheath.

The filter elements 250 and 252 are mounted to the surface 212 using a plurality of clips 254 and 256 disposed at angular intervals around the casing 212. The clips 254 and 256 can be advantageously formed from $\frac{1}{8}$ inch diameter stainless steel rod formed with a 90 degree bend to provide a first section for mounting in conventional fashion, as by welding or the like, to the casing 212, and a second end extending into the interior of the tubular filters 250 and 252. Preferably, the clips 254 and 256 are sized, and the space between the baffle plate 244 and the casing 212 is maintained, so as to compress the tubular filter elements 250 and 252 in a range between about 40 to 60% of the nominal diameter of the filters. This allowable compression range accounts for anticipated lateral offset movements between the flues 204 and 206.

It will be appreciated that the tubular filters 250 and 252 provide a substantial barrier to flue gas particulate matter that may escape from the flow chambers 214 and 216 through the passages 218, 220, 222 and 224. To further ensure that flue gas particulates are prevented from entering the sealing chamber 230, an air purge system 260 is provided. The air purge system 260 is shown in FIGS. 10, 11, and 12. As illustrated therein, the air purge system 260 includes a control system 262 including an air source, and associated valving and control mechanisms as may be necessary to provide for the introduction of air into the air purge system at a pressure of no more than about 1.5 psig. The control system 262 introduces pressurized air through an inlet line 264 into a ring header or manifold 266. The ring header 266 extends around the perimeter of the flue 204 and is mounted thereto by four angle brackets 268. The brackets 268 are attached to the casing 212 of the flue 224 in conventional fashion, as by welding or the like. The ring header 266 is in turn attached to the brackets 268 in conventional fashion, as by U-bolt connectors 270. Pressurized air is provided from the ring header 266 into the labyrinth passage 226 by means of four nozzle inlet connections 272. The nozzle inlet connections 272 are mounted at one end to the ring header 266 and at the other end to the flange 240 mounted to the flue 204. The nozzle connectors 272 direct pressurized air into the labyrinth 226 toward the filters 250 and 252. By controlling the distance between the end of the baffle plate 244 and the flange 240, as well as the distance between the baffle plate 246 and the flange 234, a positive pressure differential can be maintained between the side of the tubular filter elements 250 and 252 closest to the sealing chamber 230 and the side of the filter elements closest to the flow chambers 214 and 216. For example, a one-inch gap may be maintained for the inner baffle plate 244 and a ¼-inch gap may be maintained for the outer baffle plate 246. In this way, an air cushion is provided to resist the flow of bed material from the flow chambers 214 and 216 into the sealing chamber 230. It will be understood and appreciated, however, that the preferred gap sizes would vary depending on the size of the duct system and the geometry and spacing of other expansion joint components.

Figure 13:
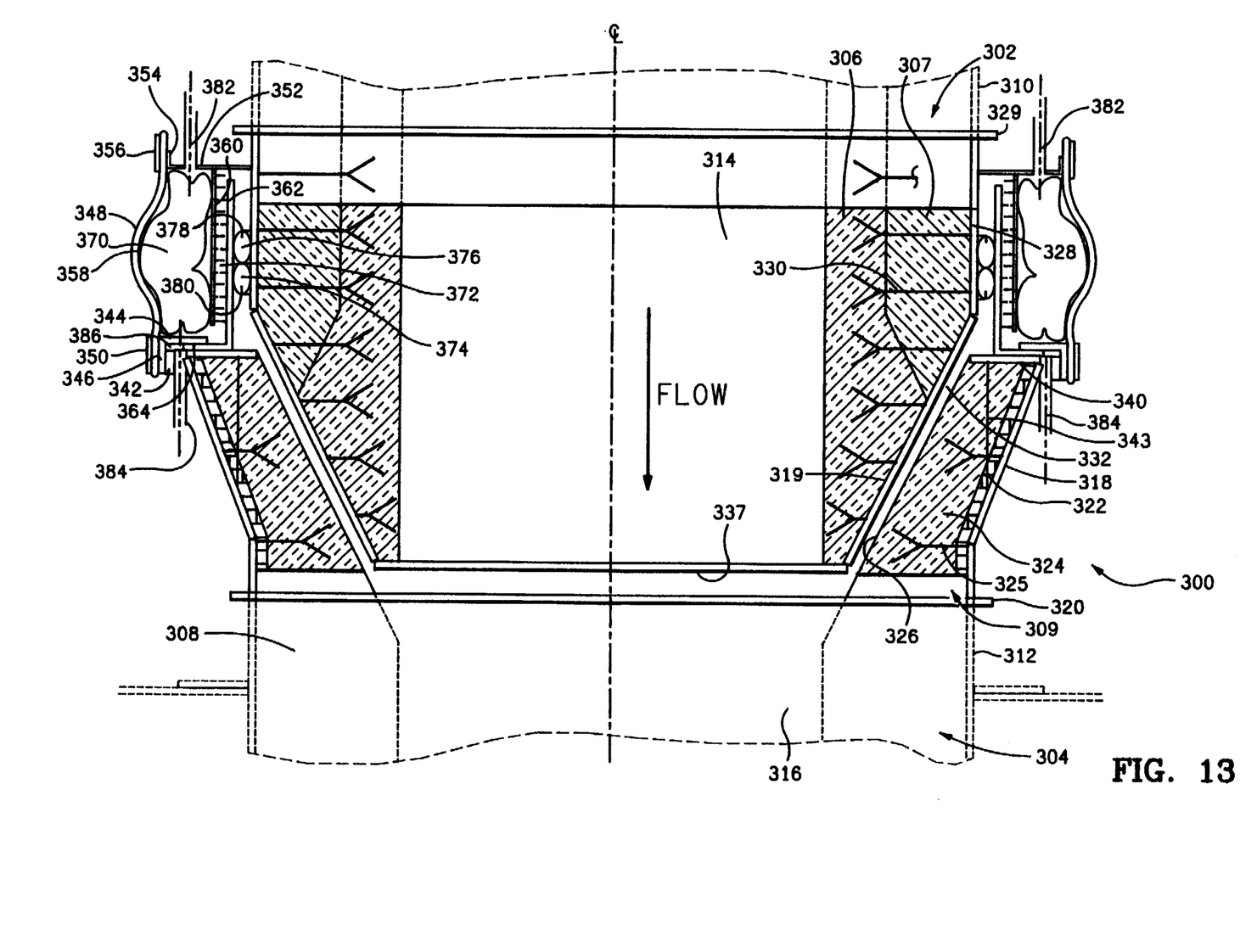
FIG. 13 is a cross-sectional view of an expansion joint constructed in accordance with another aspect of the invention.

Referring now to FIGS. 1 and 13, a loop seal expansion joint adapted for joints subject to lateral misalignment may be provided in the power generation plant between the cyclone separator and the loop seal assembly. In addition to substantial longitudinal movement, a loop seal expansion joint is often subject to substantial lateral misalignment. As shown in FIG. 13, the expansion joint 300 provides a longitudinally and laterally flexible connection between the refactory aligned flues 302 and 304. Unless otherwise noted, it is understood that the components of the expansion joint 300 are formed in a preferred construction from carbon steel. The flue 302 includes an interior arc refactory portion 306 and an exterior refractory portion 307. The flue 304 includes an interior arc refractory portion 308. The flues 302 and 304 are provided with exterior outer casings 310 and 312. Each flue duct also includes an interior, generally cylindrical flow chamber 314 and 316, formed by the refractory portions 306 and 308, respectively. In the environment of FIG. 13, the flue 302 represents the lower extension of the cyclone separator and the flue 304 represents the upward extension of the loop seal. Although these flues are shown as being generally cylindrical, other shapes could be employed depending on design criteria.

In order to assist in preventing the egress of fluidized bed material from the flow chambers 314 and 316, such as sand, fuel particulates, limestone and other particles, the flue 304 is configured to provide an expansion joint outer cone 318 formed at the upper end thereof adapted to receive an expansion joint inner cone 319 formed at the lower end of the flue 302. The expansion joint outer cone 318 extends from the upper end of the casing 312, above a landing bar 320. A ceramic fiber-board lining 322 is mounted immediately adjacent the interior of the cone 318. A tapered section of refactory material 324 that includes an interior frustoconical surface 326 is mounted to the interior of the fiber board lining 322. These components are secured to the outer cone 318 by a plurality of anchors 325, which are tensioned to hold the components 318, 322 and 324 in adjacent engagement. The expansion joint inner cone 319 extends from the bottom of a cyclone downcomer casing 328, which is mounted to the flue casing 310 at a landing bar 329. Mounted to the interior of the inner cone 319 and downcover casing 328 are the refractory portions 306 and 307, which are maintained in adjacent engagement by a plurality of tensioned anchors 330. A lower ring 337 is mounted at the bottom extent of the inner cone 319 and refractory portions 306. The respective conical ends of the flues 304 and 302 are adjacently positioned so as to form an annular tapered passage 332. The tapered passage 332 extends from the flow chambers 314 and 316 to a series of labyrinth passages 334 and 336, and to an expandable sealing chamber, as will be described below.

Figure 14:
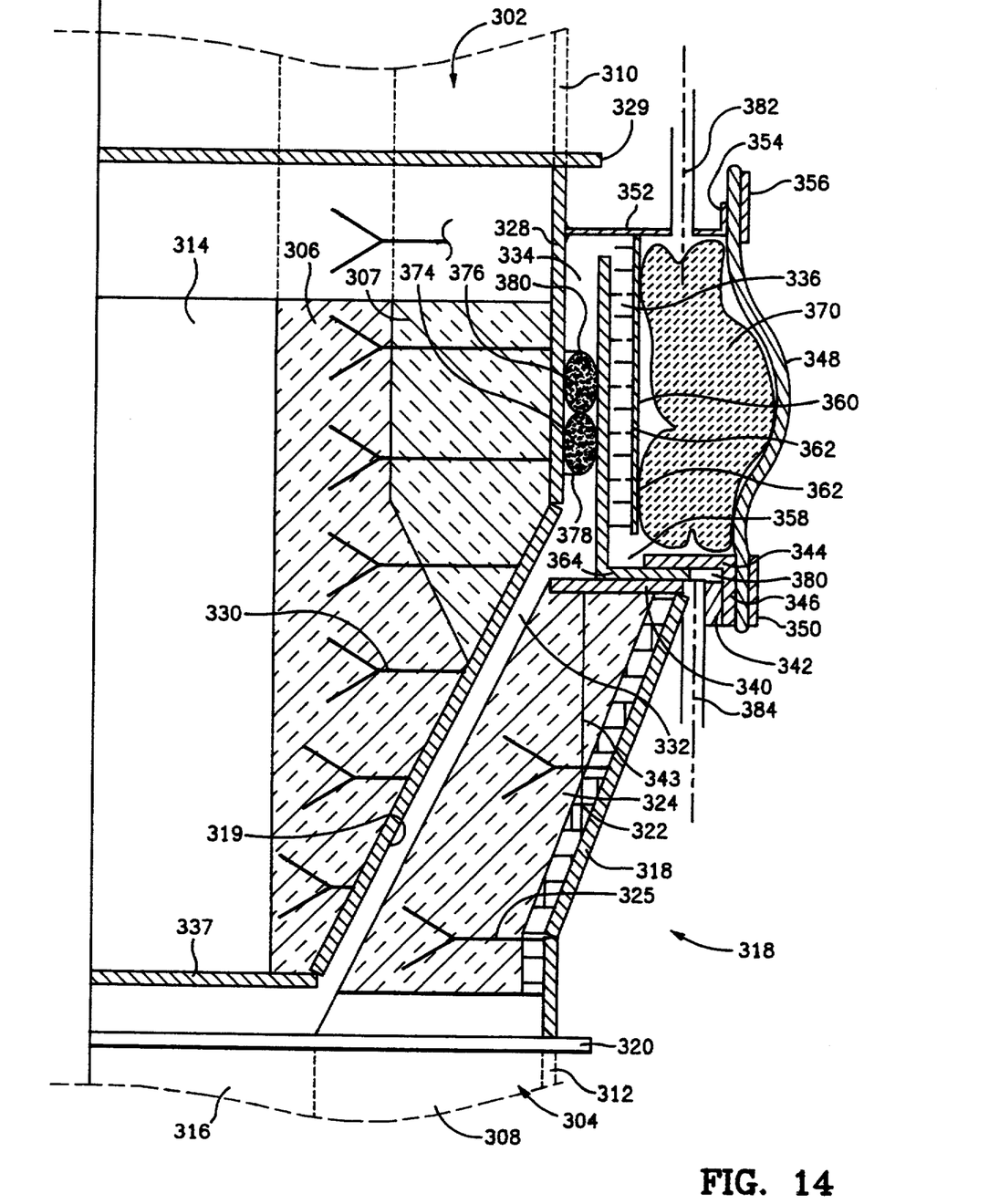
FIG. 14 is a detailed cross-sectional view of the expansion joint of FIG. 13.

Referring now to FIG. 14, the expansion joint 300 is shown in greater detail. The upward end of the outer cone section 318 terminates at a bottom flange that includes a generally radially extending inner leg 340 and a generally longitudinally extending outer leg 342 at the outer periphery thereof. The inner leg 340 is attached by conventional means, as by welding or the like, to the outer cone section 318 of the flue 304, and further using gussets 343. The outer leg 342 is connected by an appropriate array of fasteners, such as bolts, to a hold down ring having a generally horizontal inner leg 344 and a generally longitudinal outer leg 346, the outer leg 342 being fastened to the outer leg 346 of the bottom flange. The outer leg 346 of the hold down ring provides support for the lower end of a flexible pressure seal 348 by means of a lower backing ring 350. The upper end of the flexible seal 348 is similarly mounted to an upper flange including a generally horizontal inner leg 352 and a generally longitudinal outer leg 354, the flexible seal 348 being fastened to the outer leg 354 by a plurality of fasteners, such as bolts, using an upper backing ring 356. The horizontal inner leg 352 of the upper flange is fixedly mounted in conventional fashion, as by welding or the like, to the outer downcomer casing 328 of the upper flue 302.

The flexible seal 348 is preferably formed from a flexible material such as fiberglass fabric, belting, or the like. The flexible seal 348 defines the outer radial extent of a sealing chamber 358 which also extends between the inner legs 340 and 352 of the lower and upper flanges, respectively. Disposed between the flexible seal 348 and the downcomer casing 328 is a longitudinally-extending baffle plate formed by an outer ring 360, which is mounted to the inner leg 352 of the upper flange in conventional fashion, as by welding or the like. The baffle plate 360 extends generally parallel to and around the periphery of the outer downcomer casing 328. It terminates at its lower extent slightly above the inner leg 344 of the hold down ring. A second, inner baffle plate 362 is spaced inwardly from the baffle plate 360 and is formed by an inner floating ring that extends generally parallel to the downcomer casing 328. The baffle plate 362 extends upwardly to a location adjacent the inner leg 352 of the upper flange. At the lower extent of the baffle plate 362 there is provided a lower horizontal leg 364. The leg 364 is rigidly connected to the baffle plate 362 and extends radially outwardly therefrom. The baffle plate leg 364 is snugly yet slideably positioned between the inner leg 340 of the lower flange and the inner leg 344 of the hold down ring.

The baffle plates 360 and 362 define the labyrinth passages 334 and 336 extending between the frustoconical passage 332 and the pressure seal 348. The annular passage 334 is defined between the baffle plate 362 and downcomer casing 328. Similarly, the annular passage 336 is provided between the baffle plates 360 and 362. Disposed adjacent the pressure seal 348 is an insulation pillow 370 which is preferably formed from ceramic fiber material encased in a fiberglass cloth bag. There may be further provided an insulation blanket 372 disposed between the baffle plates 360 and 362. The insulation blanket 372 is preferably formed from ceramic fiber material. To assist in providing an effective seal between the interior flow chambers 314, 316 and the sealing chamber 358, there is provided in the labyrinth passage 366 a pair of tubular filter elements 374 and 376 positioned adjacent each other and extending around the periphery of the downcomer casing 310 of the flue 302. The tubular filter elements 374 and 376 are of the same construction as the filter elements 250, 252 and 50, 52 described above. The filter elements 374 and 376 are therefore preferably formed from a wire mesh nickel-chrome alloy material, such as Inconel. Depending on the required diameter, the filter elements 374 and 376 may be formed from a single wire mesh tube or may be formed from several wire mesh tubes arranged in a bundle and surrounded by a wire mesh sheath. The filter elements 374 and 376 are mounted to the downcomer casing 310 using a plurality of clips 378 and 380, respectively, disposed at angular intervals around the downcover casing. The clips 378 and 380 can be advantageously formed from one-eighth inch diameter stainless steel rod formed with a 90 degree bend to provide a first section for mounting in a conventional fashion, as by welding or the like to the downcomer casing 328, and a second end extending into the interior of the tubular filters 374 and 376.

Nominally, the clips 378 and 380 are sized, and the space between the baffle plates 360 and 362 is maintained so as to compress the tubular filter elements 374 and 376 in a range between about 40% to 60% of the nominal diameter of the filters. As indicated, however, the expansion joint 300 may be subject to significant lateral misalignment as well as longitudinal offsets. When a lateral offset occurs, it will be appreciated that the filter elements 374 and 376 tend to move relative to the baffle plate 362. If the baffle plate 362 were fixedly mounted, such lateral movement would cause the filter elements 374 and 376 to be compressed on one side of the duct 302 and to separate from the baffle plate 362 on the other side of the duct, thus degrading the effectiveness and quality of the seal. In the configuration of FIGS. 13 and 14, however, the baffle plate 362 is slideably mounted through its lower leg 364 to the inner legs 340 and 344 of the lower flange and hold down ring, respectively. Thus, lateral offset between the flues 302 and 304 may occur without significantly altering the radial distance between the downcomer casing 328 and the baffle plate 362. The seals 374 and 376 are not deformed or repositioned and the integrity of the seal is maintained. It will be further appreciated that relative longitudinal movement between the flues 302 and 304 also creates no adverse effect on the seal. The baffle plate 362 is permitted to displace longitudinally with respect to the baffle plate 360 and the downcomer casing 328. It will be further appreciated that the frustoconical shape of the annular passage 332 permits relative lateral and longitudinal movement between the flues 302 and 304 without interference between the ducts and without adversely affecting seal integrity.

The tubular filters 374 and 376 provide a substantial barrier to flue gas particulate matter that may escape from the flow chambers 314 and 316 through the passage 332. To further ensure that flue gas particulates are prevented from entering the sealing chamber 358, an air purge system identical to the system 260 previously described, may be provided. The air purge system provides a source of pressurized air at a pressure of no more than about 1.5 psig to an annular array of inlets 382 extending through the inner leg 352 of the upper flange. The inlets 382 extend directly into the sealing chamber 358 adjacent the insulation pillow 370. In addition, a similar array of pressure inlets 384 may be provided through the inner leg 340 of the lower flange into a gap 386 formed between the legs 342, 344, 346 and 364. The pressurized air helps prevent egress of flue particulate matter between the slideably arranged horizontal legs 340, 344 and 364. Thus, flue particulates are effectively prevented from escaping from the expansion joint 300.

It is understood that the foregoing description and accompanying illustrations are merely exemplary and are in no way intended to limit the scope of the invention. Various changes and modifications to the preferred embodiments should be apparent to those skilled in the art. Such changes and modifications could be made without departing from the spirit and scope of the invention. Accordingly, it is intended that all such changes and modifications be covered by the appended claims and equivalents.

What is claimed is:

1. An expansion joint in combination with and joining a first flue and a second flue in adjacent relation at a flue junction, comprising:

a sealing chamber extending between the first and second flues, defined by a first side wall mounted to the first flue, a second side wall mounted to the second flue, a flexible outer wall mounted to and extending between said first and second side walls, and an inner wall defined by one of the first and second flues;

a baffle plate mounted to one of said first or second side walls and extending toward the other of said first or second side walls;

said baffle plate defining a labyrinth passage between the flue junction and said sealing chamber flexible outer wall; and said baffle plate being slideably mounted to said first side wall and said expansion joint further including a second baffle plate spaced radially outwardly from said slideably mounted baffle plate and fixedly mounted to said second side wall.

2. The expansion joint of claim 1 wherein further including an insulation blanket disposed between said baffle plates.

3. The expansion joint of claim 1 wherein said expansion joint further includes an air purge system providing a pressurized fluid between said fixedly mounted baffle plate and said flexible outer wall.

4. An expansion joint in combination with and joining a first flue and a second flue in adjacent relation at a flue junction, comprising:
- a sealing chamber extending between the first and second flues, defined by a first side wall mounted to the first flue, a second side wall mounted to the second flue, a flexible outer wall mounted to and extending between said first and second side walls, and an inner wall defined by one of said first and second flues, said first and second flues having an interior flow chamber portion for carrying flue material and said expansion joint further including a frustoconical passage extending from said interior flow chamber portion of said first and second flues to said sealing chamber;
- a baffle plate mounted to one of said first or second side walls and extending toward the other of said first or second side walls;
- said baffle plate defining a labyrinth passage between the first flue junction and said sealing chamber flexible outer wall; and
- said baffle plate being slideably mounted for lateral movement with respect to said first or second side walls.

5. The expansion joint of claim 4 wherein the first flue includes an inner conical portion at the flue junction and the second flue includes an outer conical portion at the flue junction, said inner and outer conical portions being adjacently positioned to form said frustoconical passage.

6. An expansion joint in combination with and joining a first flue and a second flue in adjacent relation at a flue junction, comprising:
- a sealing chamber extending between the first and second flues, defined by a first side wall mounted to the first flue, a second side wall mounted to the second flue, a flexible outer wall mounted to and extending between said first and second side walls, and an inner wall defined by one of said first and second flues;
- a baffle plate mounted to one of said first or second side walls and extending toward the other of said first or second side walls;
- said baffle plate defining a labyrinth passage between the flue junction and said sealing chamber flexible outer wall;
- said baffle plate being slideably mounted for lateral movement with respect to said first or second side walls; and
- said first flue including an outwardly flared end portion encircling a corresponding inwardly tapered end portion of said second flue, said flared end portion terminating at an annular horizontal flange, and said slideable baffle plate having a lower horizontal flange slideably engaging said annular horizontal flange.

7. The expansion joint of claim 6 wherein said annular horizontal flange extends outwardly to an annular longitudinal flange, and said side wall includes a bracket having a longitudinal leg fixedly mounted to said annular longitudinal flange and a horizontal leg slideably disposed on said baffle plate horizontal flange.

8. The expansion joint of claim 7 wherein said expansion joint further includes an air purge system providing a pressurized fluid into said sealing chamber and through an aperture in said annular horizontal flange to an area of sliding contact between said horizontal flange and said baffle plate horizontal flange and between said baffle plate horizontal flange and said sidewall bracket horizontal leg.

9. An expansion joint in combination with and joining a first flue and a second flue in adjacent relation at a flue junction, comprising:
- a sealing chamber extending between the first and second flues, defined by a first side wall mounted to the first flue, a second side wall mounted to the second flue, a flexible outer wall mounted to and extending between said first and second side walls, and an inner wall defined by one of the first and second flues;
- a baffle plate mounted to one of said first or second side walls and extending toward the other of said first or second side walls;
- said baffle plate defining a labyrinth passage between the flue junction and said sealing chamber flexible outer wall;
- said baffle plate being slideably mounted for lateral movement with respect to said first or second side walls; and
- wherein said expansion joint further including a wire mesh filter element positioned in same labyrinth passage and an air purge system providing a pressurized fluid into said labyrinth between said filter and said expansion chamber flexible outer wall.

* * * * *